United States Patent
Klauke

(10) Patent No.: US 10,408,233 B2
(45) Date of Patent: Sep. 10, 2019

(54) ROTOR IN BLISK OR BLING DESIGN OF AN AIRCRAFT ENGINE

(71) Applicant: Rolls-Royce Deutschland Ltd & Co KG, Blankenfelde-Mahlow (DE)

(72) Inventor: Thomas Klauke, Luebbenau/Spreewald OT Gross-Beuchow (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 285 days.

(21) Appl. No.: 15/415,359

(22) Filed: Jan. 25, 2017

(65) Prior Publication Data
US 2017/0211592 A1  Jul. 27, 2017

(30) Foreign Application Priority Data

Jan. 27, 2016  (DE) .................. 10 2016 101 427

(51) Int. Cl.
*F04D 29/66* (2006.01)
*F01D 5/10* (2006.01)
(Continued)

(52) U.S. Cl.
CPC ............ *F04D 29/668* (2013.01); *F01D 5/10* (2013.01); *F01D 5/34* (2013.01); *F02K 3/06* (2013.01);
(Continued)

(58) Field of Classification Search
CPC .... F04D 29/668; F04D 19/002; F04D 29/329; F04D 29/34; F01D 5/10; F01D 5/34;
(Continued)

(56) References Cited

U.S. PATENT DOCUMENTS 5,373,922 A  12/1994  Marra
6,375,428 B1  4/2002  Stangeland et al.
(Continued)

FOREIGN PATENT DOCUMENTS

GB  2255138 A * 10/1992 ............... F01D 5/10
JP  2009197649 A * 9/2009

OTHER PUBLICATIONS

European Search Report dated May 4, 2017 for counterpart European Application No. 17151934.1.
(Continued)

*Primary Examiner* — Richard A Edgar
(74) *Attorney, Agent, or Firm* — Shuttleworth & Ingersoll, PLC; Timothy J. Klima

(57) ABSTRACT

A rotor in BLISK or BLING design of an aircraft engine, comprising: a rotor disc that, at its radially outer area, forms an annulus which delimits the flow channel of the aircraft engine radially inside; and a plurality of rotor blades that project from the annulus; wherein the rotor disc forms a first structure and a second structure which are arranged at a distance from each other in the radial direction, wherein the first structure and the second structure respectively have an arm that protrudes upstream and/or downstream in the axial direction. An arm of the first structure arranged upstream and an arm of the second structure arranged upstream and/or an arm of the first structure arranged downstream and an arm of the second structure arranged downstream are connected to each other by means of a damping element that comprises an elastomer or is formed from an elastomer.

21 Claims, 5 Drawing Sheets

(51) Int. Cl.
    *F01D 5/34*           (2006.01)
    *F02K 3/06*           (2006.01)
    *F04D 19/00*         (2006.01)
    *F04D 29/32*         (2006.01)
    *F04D 29/34*         (2006.01)

(52) U.S. Cl.
    CPC ......... *F04D 19/002* (2013.01); *F04D 29/329* (2013.01); *F04D 29/34* (2013.01); *F05D 2220/323* (2013.01); *F05D 2240/30* (2013.01); *F05D 2260/96* (2013.01); *F05D 2300/43* (2013.01); *F05D 2300/431* (2013.01); *F05D 2300/501* (2013.01); *F05D 2300/603* (2013.01)

(58) Field of Classification Search
    CPC .. F02K 3/06; F05D 2220/323; F05D 2240/30; F05D 2260/96; F05D 2300/43; F05D 2300/431; F05D 2300/501; F05D 2300/603
    USPC ..................................................... 416/220 R
    See application file for complete search history.

(56) References Cited

U.S. PATENT DOCUMENTS

| | | |
|---|---|---|
| 2010/0226786 A1 | 9/2010 | Mahan |
| 2014/0356134 A1* | 12/2014 | Stoughton ............. F04D 29/321 |
| | | 415/119 |
| 2016/0298460 A1* | 10/2016 | Bryant ...................... F01D 5/34 |

OTHER PUBLICATIONS

German Search Report dated Dec. 5, 2016 from counterpart German App No. 102016101427.3.

\* cited by examiner

ROTOR IN BLISK OR BLING DESIGN OF AN AIRCRAFT ENGINE

REFERENCE TO RELATED APPLICATION

This application claims priority to German Patent Application No. 10 2016 101 427.3 filed on Jan. 27, 2016, the entirety of which is incorporated by reference herein.

BACKGROUND

The invention relates to a rotor in BLISK or BLING design of an aircraft engine.

It is a known problem that the fan blades of an aircraft engine may be stimulated to vibrate due to a variety of different flow conditions. At that, the chance of undesired vibrations of the fan blades occurring is especially high when the fan is manufactured in an integral BLISK design (BLISK="blade integrated disc"), i.e. as a structural component that is formed in one piece and comprises the fan blades as well as the fan disc, or that is realized in an integral BLING design (BLING="bladed ring"), i.e. with the blades being manufactured integrally with the supporting ring. This has to do with the fact that fans manufactured in an integral design do no longer have separate blade-disc connections which contribute to the mechanical damping of the system.

Due to the lower degree of mechanical damping of integral blade-disc constructions, the maximal vibration amplitude of the fan blades is caused almost exclusively by the aerodynamic edge conditions. This may lead to strong stress and deformation in particular in operational states with a low or even negative aerodynamic damping (flutter), which has a strongly negative effect on the service life of the fan, or may even cause incipient cracks.

The problems that have been explained in connection with fans occur in rotors in BLISK or BLING design in general.

There is a need to provide measures by means of which the damping characteristics of a rotor in BLISK or BLING design, in particular of a fan in BLISK or BLING design, are improved, so that the rotor is less prone to be stimulated to vibrate.

SUMMARY

The invention regards a rotor of an aircraft engine that is realized in BLISK or BLING design. The rotor comprises a rotor disc that forms an annulus at its radially outer area, which limits the flow channel of the aircraft engine radially inside. The rotor further comprises a plurality of rotor blades that project from the annulus. The rotor disc forms a first structure and a second structure which are arranged at a distance to each other in the radial direction, wherein the first structure and the second structure have an arm that respectively projects upstream and/or downstream in the axial direction.

According to one aspect of the invention, an arm of the first structure which is arranged upstream and an arm of the second structure which is arranged upstream and/or an arm of the first structure which is arranged downstream and an arm of the second structure which is arranged downstream are connected to each other by means of a damping element that comprises an elastomer or consist of an elastomer.

By connecting the first and second structures, which are arranged at a radial distance from each other, by at least one damping element that extends in the radial direction, the mechanical damping that is available for vibration damping is significantly increased and the resulting vibration amplitudes of the BLISK or BLING rotor are reduced. Kinetic energy is dissipated inside the damping element in the form of a relative movement between the first structure and the second structure, which are arranged at a radial distance from each other, and is transformed into heat. In this way, the maximal vibration amplitudes are reduced and the structural service life of the component is increased. Here, the vibration of the rotor blades is also damped by damping the vibration between the first and second structures of the rotor disc, which are arranged at a radial distance from each other.

Thus, the invention helps to achieve a desired reduction of the vibration amplitudes of the rotor blades. Particularly the connection of the first and second structure, which are arranged at a radial distance from each other, by means of at least one damping element leads to an increased mechanical damping of that area of the rotor disc from which the rotor blades project and which is consequently subject to an increased degree of vibration.

Due to its being mounted at the arms of the rotor disc, the damping element may be exchanged without having to exchange the rotor. This makes for an easy replacement. Further, it should be noted that the damping realized through the damping element occurs without any wear and tear to the parts of the rotor.

It is to be understood that, within the meaning of the present invention, the term "rotor disc" refers not only to a disc but also to a ring. Thus, the ring of a rotor in BLING design is also referred to as a rotor disc.

The first structure of the rotor disc may for example be an annulus of the rotor disc, wherein the annulus has an arm that projects upstream in the axial direction and that can be configured as a flange, and/or an arm that projects downstream in the axial direction and that can be configured as a flange. The annulus of the rotor disc forms the radially inner delimitation of the flow path through the rotor. Radially outside, the flow path is typically delimited by a housing.

The second structure of the rotor disc may for example be a connection structure, wherein the connection structure has an arm projecting upstream in the axial direction and/or an arm projecting downstream in the axial direction. The arm projecting downstream in the axial direction may for example be provided and configured for the purpose of being coupled to a high-pressure shaft, a medium-pressure shaft, or a low-pressure shaft of the aircraft engine. If the rotor is a fan, the arm of the connection structure projecting upstream in the axial direction may for example be provided and configured to be connected to a nose cone of the fan.

According to an embodiment of the invention, the damping element forms a circular ring. Since the rotor as well as the first structure and the second structure of the rotor are respectively formed in a ring-shaped manner, it is expedient to design the damping element in a ring-shaped manner, as well. Here, in the area of its radially inner edge, the ring-shaped damping element is connected to the second structure, and in the area of its radially outer edge is connected to the first structure. However, in alternative designs it can also be provided that, instead of a ring-shaped damping element, a plurality of damping elements respectively forming a ring segment are provided. Alternatively, it can also be provided that, instead of a ring-shaped damping element, a plurality of rod-shaped damping elements is used.

In one embodiment of the invention, it is provided that the damping element is connected to the respective arm or flange in its end area or in the area of its front side. In this manner, a particularly strong damping of the arms of the first and second structure, which are arranged at a radial distance from each other, is provided, with the damping being the stronger the further towards the ends of the arms the damping element is attached.

It can be provided that the damping element is attached at the respective projecting arm by means of bolted joints. For this purpose, one or multiple bolted joints can be used. Alternatively, it can be provided that the damping element is attached at the respective projecting arm or flange by means of a positive-locking connection. Such a positive-locking connection is for example provided through a circumferential groove in the respective arm of the first or second structure.

In an exemplary embodiment of the invention, it is provided that the damping element consists of an elastomer layer that is respectively held inside an edging at its radially inner end and at its radially outer end, wherein the edging is attached to the respective projecting arm.

In a further exemplary embodiment of the invention it is provided that the damping element consists of an elastomer layer that respectively forms a bulge at its radially inner end and at its radially outer end, with the bulge being held inside a recess in a positive-locking manner at the respective arm of the first and second structure. This is an example of a positive-locking connection of the damping element to the first and second structures. Here, it can be provided that a fiber-reinforcement is integrated in the bulge, so that the damping element is safely secured inside the recess (for example a groove).

In a further exemplary embodiment of the invention it is provided that the damping element forms meshing first (outer) and second (inner) fingers, wherein the first fingers are connected to the arm of the first structure and the second fingers are connected to the arm of the second structure, and wherein at least some of the meshing fingers are connected to each other by means of an elastomer or by means of a fiber-reinforced elastomer, for example a rubber or a fiber-reinforced rubber fabric. In the event of oscillations or vibrations, the elastomer is deformed by shear forces that act at the elastomer, which creates the damping characteristics.

In a further exemplary embodiment of the invention it is provided that the damping element forms meshing first (outer) and second (inner) fingers, wherein the first fingers are connected to the arm of the first structure and the second fingers are connected to the arm of the second structure, and wherein at least some of the meshing fingers are connected to each other via a viscoelastic fluid. Any leakage of the viscoelastic fluid is avoided by means of a seal. This embodiment variant is particularly suitable if high temperatures are present.

According to one embodiment, the elastomer that is either a component of the damping element or that forms the entire damping element is rubber. What is meant by rubber within the meaning of the present invention is any vulcanized rubber, natural rubber as well as synthesized rubber.

According to another exemplary embodiment, the elastomer is a viscoelastic material that has a partially elastic, partially viscous material behavior. What is of particular interest here are so-called Kelvin bodies, which time-dependently deform like a fluid, but to a limited degree and in a reversible manner like a solid body.

Further, it can be provided that the elastomer is reinforced with a fiber-reinforced material at least in partial areas. Thus, the damping element can for example be a fiber-reinforced rubber fabric. A fiber-reinforcement can for example be carried out by means of glass fibers and/or carbon fibers and/or aramid fibers.

In another embodiment of the invention it is provided that the damping element has multiple material layers, wherein at least one of the material layers is formed from an elastomer or contains such an elastomer. Here, it can be provided that the multiple material layers extend in parallel to each other.

The damping element has a higher elasticity or a lower modulus of elasticity than the material that the rotor disc of the rotor is made of. According to different embodiment variants, the modulus of elasticity of the damping element is smaller than the modulus of elasticity of the material of the rotor disc by at least the factor 10, in particular by at least the factor 50, in particular by at least the factor 100, in particular by at least the factor 500, or in particular by at least the factor 1000.

In a further aspect of the invention, the invention relates to an aircraft engine with a rotor according to the invention. The aircraft engine can for example be a jet engine, for example a turbofan engine.

In a further aspect of the invention, the invention relates to a fan in BLISK design of an aircraft engine, which comprises:
a fan disc,
a plurality of fan blades that are connected to the fan disc,
wherein the fan disc forms an annulus that delimits a flow channel of the aircraft engine radially inside, wherein the annulus has an arm that projects upstream in the axial direction and/or an arm that projects downstream in the axial direction,
wherein the fan disc forms a connection structure that has an arm projecting upstream in the axial direction and/or an arm projecting downstream in the axial direction,
wherein the arms of the annulus and the arms of the connection structure are arranged at a distance from each other in the radial direction,
wherein an arm of the annulus arranged upstream and an arm of the connection structure arranged upstream and/or an arm of the annulus arranged downstream and an arm of the connection structure arranged downstream are connected to each other by means of a damping element, and
wherein the damping element comprises an elastomer or consists of an elastomer.

BRIEF DESCRIPTION OF THE DRAWINGS

The invention will be explained in more detail on the basis of exemplary embodiments with reference to the accompanying drawings in which.

DETAILED DESCRIPTION

Figure 1:
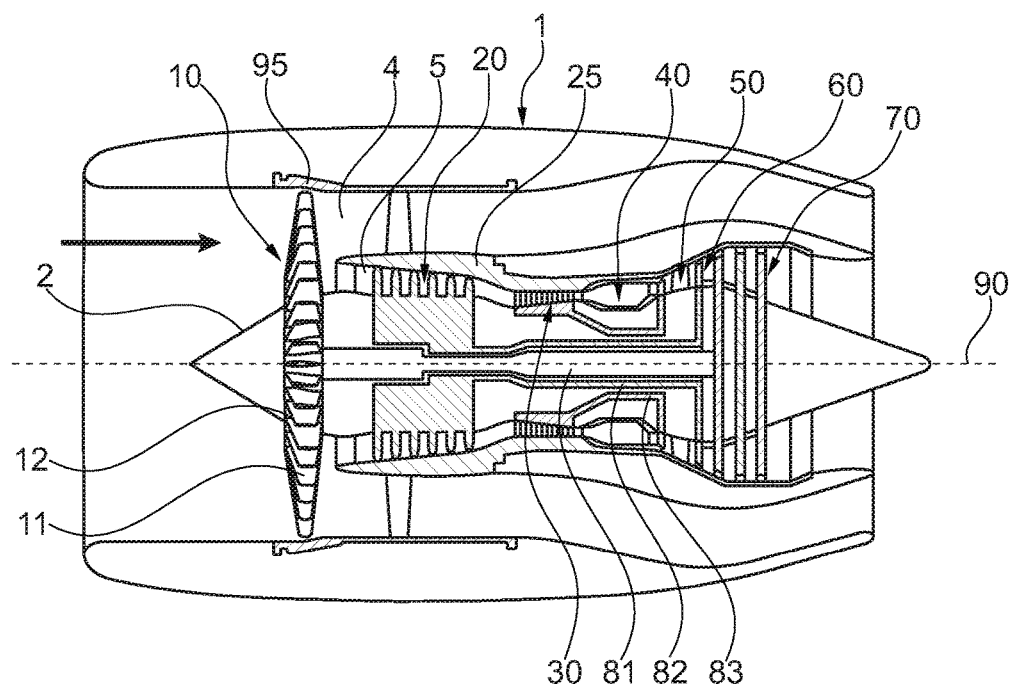
FIG. 1 shows a simplified schematic sectional view of an aircraft engine that is configured as a double-flow jet engine and that comprises a fan.

FIG. 1 schematically shows a double-flow jet engine 1 that has a fan stage with a fan 10 as the low-pressure compressor, a medium-pressure compressor 20, a high-pressure compressor 30, a combustion chamber 40, a high-pressure turbine 50, a medium-pressure turbine 60, and a low-pressure turbine 70.

The medium-pressure compressor 20 and the high-pressure compressor 30 respectively have a plurality of compressor stages that respectively comprise a rotor stage and a stator stage. The jet engine 1 of FIG. 1 further has three separate shafts, a low-pressure shaft 81 which connects the low-pressure turbine 70 to the fan 10, a medium-pressure shaft 82 which connects the medium-pressure turbine 60 to the medium-pressure compressor 20, and a high-pressure shaft 83 which connects the high-pressure turbine 50 to the high-pressure compressor 30. However, this is to be understood to be merely an example. If, for example, the jet engine has no medium-pressure compressor and no medium-pressure turbine, only a low-pressure shaft and a high-pressure shaft would be present.

The fan 10 has a plurality of fan blades 11 that are connected to a fan disc 12. Here, the annulus of the fan disc 12 forms the radially inner delimitation of the flow path through the fan 10. Radially outside, the flow path is delimited by a fan housing 95. A nose cone 2 is arranged upstream of the fan disc 12.

Behind the fan 10, the jet engine 1 forms a secondary flow channel 4 and a primary flow channel 5. The primary flow channel 5 leads through the core engine which comprises the medium-pressure compressor 20, the high-pressure compressor 30, the combustion chamber 40, the high-pressure turbine 50, the medium-pressure turbine 60, and the low-pressure turbine 70. At that, the medium-pressure compressor 20 and the high-pressure compressor 30 are surrounded by a circumferential housing 25 which forms an annulus surface at the internal side, delimitating the primary flow channel 5 radially outside. Radially inside, the primary flow channel 5 is delimited by corresponding rim surfaces of the rotors and stators of the respective compressor stages, or by the hub or elements of the corresponding drive shaft connected to the hub.

The described components have a common symmetry axis 90. The symmetry axis 90 defines an axial direction of the aircraft engine. A radial direction of the aircraft engine extends perpendicularly to the axial direction.

In the context of the present invention, the fan 10 is of particular importance, as will be explained in the following.

Figure 2:
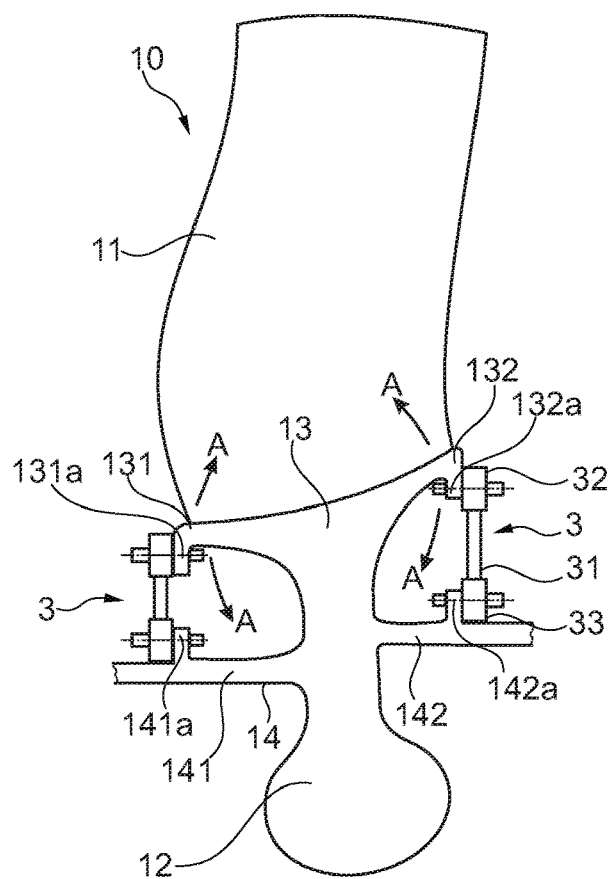
FIG. 2 shows a first exemplary embodiment of a fan in BLISK design, in which respectively an arm of an annulus and an arm of a connection structure are connected to each other by means of a damping element.

FIG. 2 shows an exemplary embodiment of a fan 10 that has fan blades 11 and a fan disc 12. The fan 10 is realized in BLISK design. In its radially outer area, the fan disc 12 forms an annulus 13 from which the fan blades 11 project in the radial direction. The annulus 13 forms the radially inner delimitation of the flow channel of the fan 10. The annulus 13 can also be referred to as a platform or as a disc wheel.

The annulus 13 forms two arms, an arm 131 arranged upstream and an arm 132 arranged downstream. These structures 131, 132 are arms insofar as a material recess is located radially below the structures 131, 132. Within the meaning of the present invention, an arm is any structure that projects in at least one spatial direction with respect to another structure. The arms 131, 132 project upstream or downstream (that is, either counter to the axial direction or in the axial direction) insofar as they protrude with respect to the main body of the fan disc 12, with no material being present below the arms 131, 132 (i.e., in the radial direction inward).

Further, the fan disc 12 comprises a connection structure 14 which also has two arms, an arm 141 arranged upstream and an arm 142 arranged downstream. The arm 141 is provided and configured for the purpose of being connected to the nose cone of the fan 10. The arm 142 is provided and configured to be coupled to the low-pressure shaft of the aircraft engine (cf. low-pressure shaft 81 of FIG. 1). Therefore, particularly the arm 142 represents a drive arm. The connection of the respective arm 141, 142 to the nose cone or to a low-pressure shaft can be effected directly or via intermediate elements.

In the event of any vibration stimulation to the blades 11, the situation occurs in which the arms 131, 132 of the annulus 13 begin vibrating with respect to the arms 141, 142 of the connection structure 14, as is indicated by the arrows A.

This relative vibration movement between the arms 131, 132 and the arms 141, 142 is reduced by the damping elements 3 provided according to the invention. Thus, the arms 131, 141 are connected to each other at their respective end by the damping element 3, and the arms 132, 142 are connected to each other at their respective end by the damping element 3. For this purpose, the arms respectively form a flange or a front surface 131a, 141a, 132a, 142a, at which the respective edge area of the damping element 3 is attached by means of bolted joints.

The damping elements 3 cause a damping of the vibration between the arms 131, 132 of the annulus 13 and the arms 141, 142 of the connection structure 14, which are arranged at a distance from them in the radial direction. This damping of the vibration A leads to a desired damping of the vibration amplitude of the blades 11.

Figure 3:
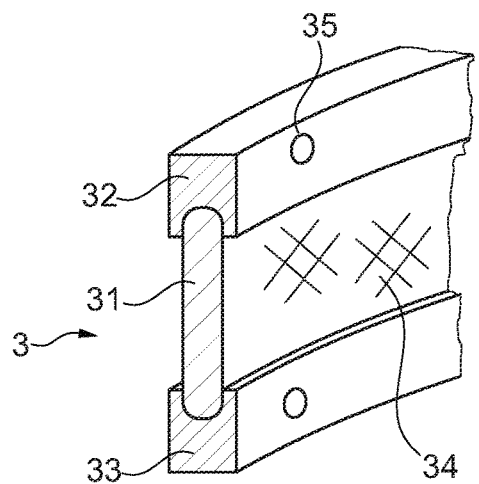
FIG. 3 shows an enlarged perspective rendering of the damping element of FIG. 2, wherein the damping element has an elastomer layer that is respectively held within an edging at its upper and at its bottom edge.

As can also be seen in the enlarged rendering of FIG. 3, in the shown exemplary embodiment the damping element 3 has an elastomer layer 31 as the damping material. The elastomer layer 31 may for example consist of rubber. The rubber can have a fiber-reinforcement 34. The elastomer layer 31 can be formed in a homogenous manner or can consist of different material layers. At the radially outer edge and at the radially inner edge, the elastomer layer 31 is respectively held inside an edging 32, 33. The edging 32, 33 has holes 35 by means of which the damping element 3 can be attached at the respective arms 131, 141, 132, 142 by means of bolted joints.

It is to be understood that in the exemplary embodiment of FIG. 2, a damping element is provided at the upstream side of the fan 10 as well as at the downstream side of the fan 10. However, this is not necessarily the case. Thus, in alternative exemplary embodiments of the invention, it can be provided that a damping element 3 is only realized on one of these sides. This may depend on which of the sides the relative vibrating movements of the annulus 13 or its arms 131, 132 are more pronounced with respect to the connection structure 141, 142.

Figure 4:
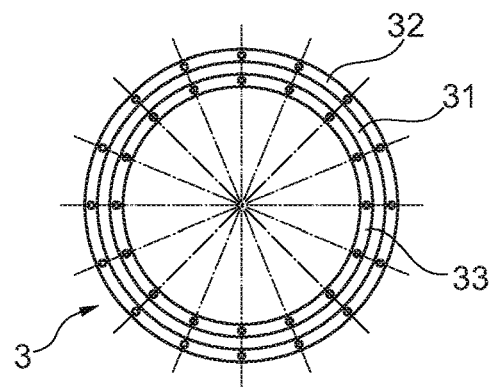
FIG. 4 shows a rendering of the damping element of FIG. 2 in a front view.

FIG. 4 shows the damping element 3 of FIGS. 2 and 3 in a front view. As can be clearly seen here, the damping element 3 is configured in the design of a circular ring that corresponds to the ring-shaped design of the fan disc 12 and the respective arms 131, 132, 141, 142. FIG. 4 shows the ring-shaped elastomer layer 31 and the two ring-shaped edgings 32, 33 that connect to the elastomer layer 31 at the radially outer and at the radially inner end. The edgings 32, 33 can for example be connected to the respective arm, which is also formed as a circular ring, by means of bolted joints.

Figure 5:
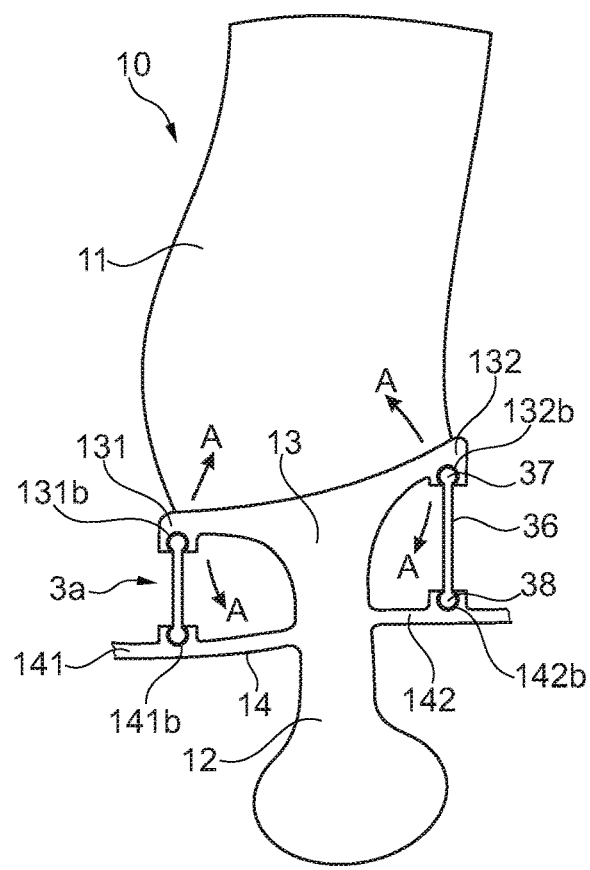
FIG. 5 shows a second exemplary embodiment of a fan in BLISK design, in which respectively an arm of an annulus and an arm of a connection structure are connected to each other by means of a damping element.

FIG. 5 shows an alternative exemplary embodiment that differs from the exemplary embodiment of FIG. 2 in the design of the damping elements 3a. Otherwise, when it comes to the structure of the fan 10 of FIG. 5, it may be referred to the corresponding explanations regarding FIG. 2.

Figure 6:
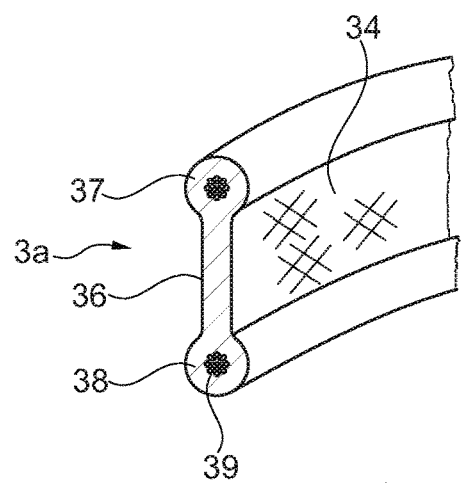
FIG. 6 shows an enlarged perspective rendering of the damping element of FIG. 5, wherein the damping element consist of an elastomer layer that respectively forms a bulge at its radially inner end and at its radially outer end.

As is also shown in the enlarged rendering of FIG. 6, the damping element 3a consists of an elastomer layer 36 that respectively forms a bulge 37, 38 at its radially outer end and at its radially inner end, which is held in a positive-locking manner inside the recess 131b, 141b, 132b, 142b at the respective arms 131, 141, 132, 142 of the first and the second structure 13, 14. Again, the elastomer layer 31 can for example consist of rubber that may be provided with a fiber reinforcement 34.

Here, it is provided that, in the area of the bulges 37, 38, a fiber that extends in the longitudinal direction or a bundle of fibers 39 that extends in the longitudinal direction is integrated to mechanically reinforce the bulges 37, 38 and to avoid any possibility of the bulges 37, 38 being excessively compressed.

The recesses 131b, 141b, 132b, 142b of the respective arms 131, 141, 132, 142 are respectively formed by a circumferential groove. In one design, it can be provided that the damping elements 3a can be clipped into the circumferential grooves in a simple manner, which facilitates simple mounting and a simple replacement if repairs become necessary.

Also, when it comes to the exemplary embodiment of FIGS. 5 and 6, the damping element 3a can alternatively be arranged only on the upstream-facing side or only at the downstream-facing side of the fan disc 12.

Figure 7:
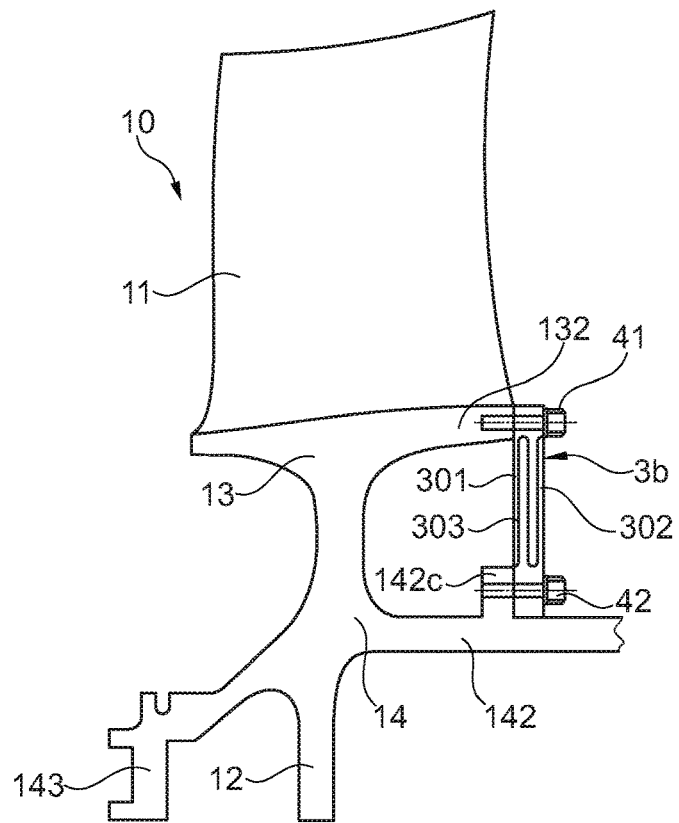
FIG. 7 shows a third exemplary embodiment of a fan in BLISK design in which an arm of an annulus and an arm of a connection structure are connected to each other by means of a damping element.

FIG. 7 shows a further exemplary embodiment of a fan 10 with a fan disc 12 and fan blades 11. In contrast to the exemplary embodiments of FIGS. 2 to 6, in this exemplary embodiment a damping element 3b is realized only on the downstream-facing side of the fan 10. Here, the annulus 13 has an arm 132 that extends downstream, and the connection structure 14 has an arm 142 that extends downstream and comprises a flange 142c, with the arms being arranged at a distance from each other in the radial direction and accordingly with a material recess being located in between them. At the upstream-facing side of the compressor disc 12, the connection structure 14 has an arm 143 which, in the shown embodiment variant, extends inward in a radially oblique manner and at its end has structures for being connected to other structural components.

The damping element 3b comprises meshing outer fingers 301 and inner fingers 302 that respectively extend radially, wherein the outer fingers 301 are connected to the arm 132 of the annulus 13 and the inner fingers 302 are connected to the arm 142 of the connection structure 14. At that, the meshing fingers 301, 302 are connected to each other by means of an elastomer layer 303, which can be fiber-reinforced. In their base area, the fingers 301, 302 are connected to the respective arm or flange 132, 142c by means of bolted joints 41, 42.

Figure 8:
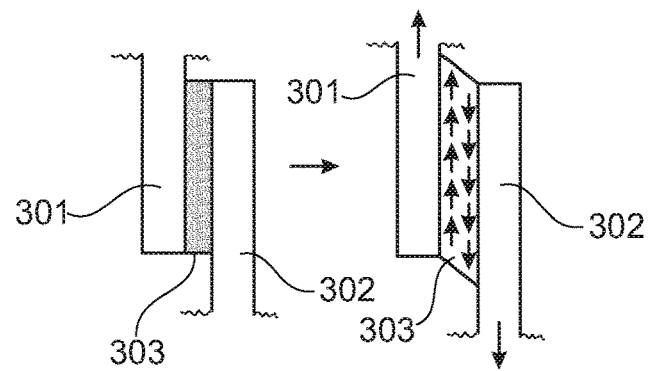
FIG. 8 shows an enlarged rendering of the damping element of FIG. 7, with the non-deformed and a deformed state being shown.

FIG. 8 illustrates the operating principle of the damping in the exemplary embodiment of FIG. 7. What is shown are the adjoining layers of the outer finger 301, the fiber-reinforced elastomer 303, and the inner finger 302. The vibrations of the annulus 13 are transferred to the outer finger 301 and act on the elastomer 303 as shear forces, as is shown in the right illustration of FIG. 8. A portion of the vibration energy is dissipated inside the elastomer 303, leading to vibration damping.

It is to be understood that FIG. 8 is a sectional view. The outer fingers 301, inner fingers 302 and the elastomer layer 303 are respectively formed in a ring-shaped manner. One or multiple outer and inner fingers can be provided, with respectively an elastomer layer being arranged in between them.

Figure 9:
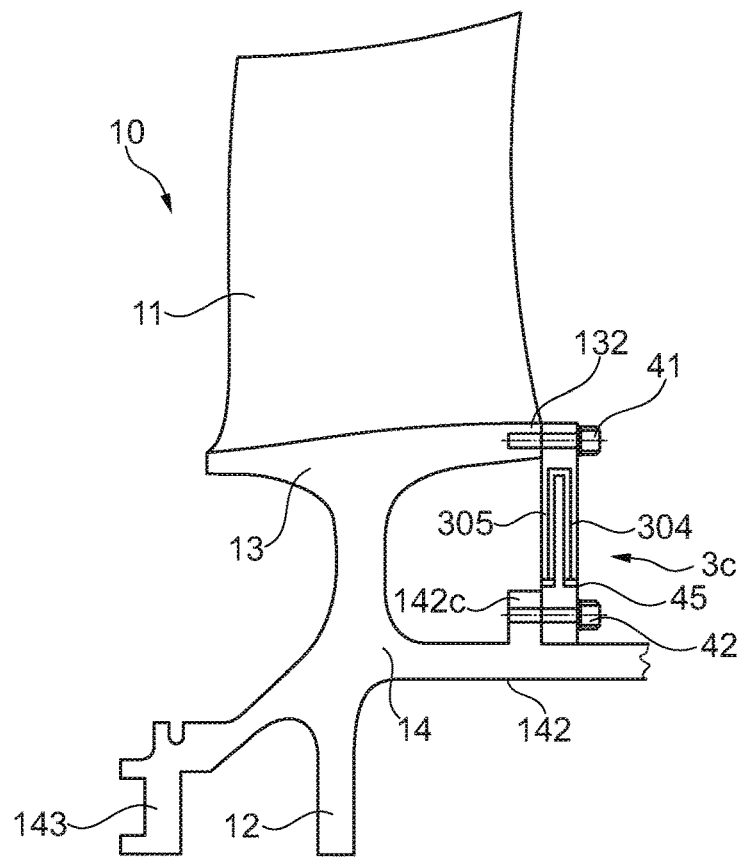
FIG. 9 shows a fourth exemplary embodiment of a fan in BLISK design, in which an arm of an annulus and an arm of a connection structure are connected to each other by means of a damping element.

FIG. 9 shows an exemplary embodiment that is similar to the exemplary embodiment of FIG. 7 and differs from the latter with respect to the damping material of the damping element 3c. Here, too, an arrangement 305 of meshing fingers is provided. Therefore, it may be referred to description regarding FIG. 7. As the damping material, a viscoelastic fluid 304 is provided, by means of which the meshing fingers are connected to each other. Particularly if high temperatures and vibration frequencies are present, it is advantageous to use a viscoelastic damping fluid. Seals 45 are provided to avoid any leakage of the fluid 304.

The present invention has been described above based on multiple exemplary embodiments that refer to fans in BLISK design. However, the principles of the present invention likewise apply to other rotors in BLISK design or in BLING design, in particular to rotors of a compressor stage of an aircraft engine. They can be rotors of a compressor stage of a low-pressure compressor, of a medium-pressure compressor, or of a high-pressure compressor. The rotor blades of such rotors are also subjected to vibrations that can be damped in the described manner by using damping elements.

It is furthermore pointed out that the features of the individually described exemplary embodiments of the invention can be combined in various combinations with one another. Where areas are defined, they include all the values within these areas and all the sub-areas falling within an area.

What is claimed is:

1. A rotor in BLISK or BLING configuration of an aircraft engine, comprising:
    a rotor disc or ring including a radially outer area that forms an annulus that delimits a radially interior side of a flow channel of the aircraft engine, and
    a plurality of rotor blades that project from the annulus, wherein the rotor disc or ring includes a first structure and a second structure, which are arranged at a distance from each other in a radial direction, wherein the first structure and the second structure each respectively have an arm that projects at least one chosen from upstream and downstream in an axial direction,
    a damping element,
    wherein the arm of the first structure is fixedly connected to a first portion of the damping element and the arm of the second structure is fixedly connected to a second portion of the damping element such that the arm of the first structure and the arm of the second structure are connected to each other by the damping element and kinetic energy between the arm of the first structure and the arm of the second structure is dissipated internally of the damping element, with at least one chosen from the arm of the first structure and the arm of the second structure both being arranged upstream, and, the arm of the first structure and the arm of the second structure both being arranged downstream, and wherein the damping element comprises an elastomer.

2. The rotor according to claim 1, wherein the damping element forms a ring or ring segments.

3. The rotor according to claim 1, wherein the damping element is connected to the respective arm in an end area of the respective arm.

4. The rotor according to claim 1, and further comprising bolted joints mounting the damping element at the respective arm.

5. The rotor according to claim 1, wherein the damping element is fixedly connected at the respective projecting arm by a form-locking connection.

6. The rotor according to claim 1, wherein the damping element includes a radially inner end and a radially outer end and is respectively held inside an edging at the radially inner end and at the radially outer end, wherein the edging is mounted at the respective projecting arm.

7. The rotor according to claim 1, wherein the damping element includes a radially inner end and a radially outer end and forms a bulge at the radially inner end and at the radially outer end, which is held inside a recess in a positive-locking manner at the respective arms of the first and the second structure.

8. The rotor according to claim 1, wherein the damping element forms meshing outer and inner fingers, wherein the outer fingers are fixedly connected to the arm of the first structure and the inner fingers are fixedly connected to the arm of the second structure, and wherein at least some of the meshing fingers are connected to each other by the elastomer or by a fiber-reinforced elastomer.

9. The rotor according to claim 1, wherein the elastomer is a rubber.

10. The rotor according to claim 1, wherein the elastomer is a viscoelastic material.

11. The rotor according to claim 1, wherein the elastomer is reinforced with a fiber-reinforced material at least in partial areas.

12. The rotor according to claim 1, wherein the damping element includes multiple material layers, wherein at least one of the multiple material layers includes the elastomer.

13. The rotor according to claim 1, wherein the first structure is formed by the annulus of the rotor disc or ring.

14. The rotor according to claim 1, wherein the second structure is formed by a connection structure.

15. The rotor according to claim 14, wherein the arm of the connection structure projects downstream in the axial direction and is configured to be coupled to at least one chosen from a high-pressure shaft, a medium-pressure shaft, and a low-pressure shaft of the aircraft engine.

16. The rotor according to claim 14, wherein the rotor disc or ring is a fan in BLISK configuration, wherein the plurality of rotor blades are fan blades and the rotor disc is a fan disc, and wherein the arm of the connection structure projects upstream in the axial direction and is configured to be connected to a nose cone of the fan.

17. The rotor according claim 1, wherein the damping element has a modulus of elasticity that is smaller than a modulus of elasticity of the material of the rotor disc or ring by at least a factor of 10.

18. An aircraft engine including the rotor according to claim 1.

19. The rotor according claim 1, wherein the damping element has a modulus of elasticity that is smaller than a modulus of elasticity of the material of the rotor disc or ring by at least a factor of 50.

20. A fan in BLISK configuration of an aircraft engine, comprising:

a fan disc, a plurality of fan blades that are connected to the fan disc, wherein the fan disc forms an annulus that delimits a radially interior side of a flow channel of the aircraft engine, wherein the annulus includes at least one chosen from an arm that projects upstream in an axial direction and an arm that projects downstream in the axial direction, wherein the fan disc forms a connection structure that includes at least one chosen from an arm that projects upstream in the axial direction and an arm that projects downstream in the axial direction, wherein the arm of the annulus and the arm of the connection structure are arranged at a distance from each other in a radial direction, a damping element, wherein the arm of the annulus is fixedly connected to a first portion of the damping element and the arm of the connection structure is fixedly connected to a second portion of the damping element such that the arm of the annulus and the arm of the connection structure are connected to each other by the damping element and kinetic energy between the arm of the annulus and the arm of the connection structure is dissipated internally of the damping element, with at least one chosen from the arm of the annulus and the arm of the connection structure both being arranged upstream, and, the arm of the annulus and the arm of the connection structure both being arranged downstream, and wherein the damping element comprises an elastomer.

21. A rotor in BLISK or BLING configuration of an aircraft engine, comprising:

a rotor disc or ring including a radially outer area that forms an annulus that delimits a radially interior side of a flow channel of the aircraft engine, and a plurality of rotor blades that project from the annulus, wherein the rotor disc or ring includes a first structure and a second structure, which are arranged at a distance from each other in a radial direction, wherein the first structure and the second structure each respectively have an arm that projects at least one chosen from upstream and downstream in an axial direction, a damping element, wherein the arm of the first structure and the arm of the second structure are connected to each other by the damping element, and with at least one chosen from the arm of the first structure and the arm of the second structure both being arranged upstream, and, the arm of the first structure and the arm of the second structure both being arranged downstream, and wherein the damping element comprises an elastomer, wherein the damping element includes meshing outer and inner fingers, wherein one of the inner fingers and the outer fingers are connected to the arm of the first structure and the other of the inner fingers and the outer fingers are connected to the arm of the second structure, and wherein at least some of the inner fingers and the outer fingers are connected to each other by the elastomer.

* * * * *